United States Patent [19]

Claussen et al.

[11] Patent Number: 5,286,420
[45] Date of Patent: Feb. 15, 1994

[54] PRODUCTION OF LIGHT POLARIZING FILMS

[75] Inventors: Uwe Claussen, Leverkusen; Friedrich-Wilhelm Kröck, Odenthal; Edouard Roche, Lohmar, all of Fed. Rep. of Germany

[73] Assignee: Bayer Aktiengesellschaft, Leverkusen, Fed. Rep. of Germany

[21] Appl. No.: 913,734

[22] Filed: Jul. 14, 1992

Related U.S. Application Data

[62] Division of Ser. No. 743,723, Aug. 12, 1991, abandoned.

[30] Foreign Application Priority Data

Aug. 25, 1990 [DE] Fed. Rep. of Germany ....... 4026892

[51] Int. Cl.$^5$ ............................................. B29D 11/00
[52] U.S. Cl. ..................................... 264/1.3; 264/205; 264/216; 427/163
[58] Field of Search ........................ 264/1.3, 205, 216; 427/163

[56] References Cited

U.S. PATENT DOCUMENTS

| | | | |
|---|---|---|---|
| 2,996,956 | 8/1961 | Ryan et al. | 264/1.3 |
| 3,015,989 | 1/1962 | Delangre et al. | 264/1.3 |
| 3,058,393 | 10/1962 | Ryan et al. | 264/1.3 |
| 4,448,823 | 5/1984 | Clifford | 428/1 |
| 4,854,995 | 8/1990 | Kasper et al. | 264/216 |
| 4,941,997 | 7/1990 | Dicker et al. | 264/1.3 |
| 4,960,552 | 10/1990 | Portugall et al. | 264/176.1 |
| 4,992,218 | 2/1991 | Sugio et al. | 264/1.3 |
| 5,007,942 | 4/1991 | Claussen et al. | 8/506 |
| 5,071,906 | 12/1991 | Tanaka et al. | 264/1.3 |

FOREIGN PATENT DOCUMENTS

2144760  3/1985  United Kingdom.

*Primary Examiner*—James Lowe
*Attorney, Agent, or Firm*—Connolly & Hutz

[57] ABSTRACT

A process for the production of light-polarizing films containing polyvinyl alcohol, dichroic dye-producing components, optionally other dye-producing components, optionally additives, and optionally surface active compounds, wherein the films comprise two or more layers and said film layers have a sudden change in composition at the layer phase boundaries between at least two layers, and said layers are applied to a substrate by means of a multiple coater.

3 Claims, No Drawings

PRODUCTION OF LIGHT POLARIZING FILMS

This application is a division of application Ser. No. 07/743,723 filed on Aug. 12, 1991, and now abandoned.

This invention relates to light-polarizing films containing polyvinyl alcohol and dichroic dye-producing components, optionally other dye-producing components, optionally additives and optionally surfactants, characterized in that they comprise two or more layers and have a sudden change in their composition at the phase boundary between at least two layers, and to a process for their production.

Films based on polyvinyl alcohol (PVAL) containing iodine or dichroic dyes as polarizing agents are known.

Hitherto, only iodine-containing polarizers have been used in practice, for example in passive liquid crystal displays for displaying information. In the presence of moisture, these polarizers are characterized by excellent light stability and by excellent dichroic properties in the long-wave region of the visible spectrum. The active agent of these films is the iodine/PVAL complex (M. M. Zwick, J. Apply. Polym Sci.; 9, 2393-2424 (1965)) which absorbs daylight over a wide band, but not completely. In the short-wave (orange-yellow) region, there is an area of reduced extinction, so that the films are blue in color.

This has unfortunate consequences when it is desired to produce white light, for example after passage through the film. The unpolarized light let through reduces the dichroism and, hence, the polarizing power in this region. To increase it again, the concentration of iodine complex has to be increased. However, this correction in the short-wave region results in excessive extinction in the long-wave region. This in turn results in a distinct reduction in the light let through in the pass position. An optical display equipped with this film is reduced in its lightness. To achieve acceptable lightness, compromises have to be reached.

An important critical parameter of a universally useable optical display is its readability under different illumination conditions which is normally referred to as the "perceived contrast ratio" (PCR). It follows from this that the transmission on the one hand must be made as low as possible in the stop position (readability in darkness) and, on the other hand, as high as possible in the pass position (readability in lightness). This requires completely uniform polarizing power on the part of the filter over the entire spectral region which, in principle, cannot be achieved with the iodine film.

There has been no shortage of attempts to replace iodine by mixtures of other dichroic chromophores to produce a neutral gray with uniform dichroism. However, a range of very effective dyes is needed for this purpose. In addition to good light and weather fastness values, they must have high extinction and high dichroism in the matrix.

Thus, polyazo dyes have mainly been proposed (Nippon Kayaku JA 59-145 255, 60-156 759, 60-168 743). However, although dichroism is a widespread property among dyes (cf. W. Hanle, H. Scherer, Zeitschr. Naturforsch. 6a, 437-439 (1951)), it has hitherto proved to be impossible to achieve or surpass the spectral properties of iodine films. This is attributable to the absence of good blue tones, the need for the high dichroism of the dye/matrix system and the extreme color density required in the absorbing state. The reason for this is that, by comparison with the dyes, the iodine molecule bound in the complex has a high molar extinction of the order of 43,000 (R. R. Baldwin, R. S. Baer, R. E. Rundle, J. Am. Chem. Soc., 66 111 (1944)). Since the chromophore is diatomic, very high molar concentrations and, hence, extreme extinctions are obtained. Dyes with comparable molar absorption generally have distinctly higher—generally 4 to 8 times higher—molecular weights, so that it is difficult to obtain the required extinctions with one dye. Accordingly, very high concentrations of dyes have to be used; the solubility limit in the support material is soon reached and oversaturation effects are obtained. These effects may be reflected, for example, in the unwanted scattering of light.

In addition, at least one dye triple is necessary for producing a uniform gray color. In principle, only chromophores that are compatible with one another can of course be used in such triples which, in view of the number of properties to be established, represents another considerable limitation of the possibilities unless it is possible to harmonize the interactions. Since this is rarely fully achieved, the problem of the matrix being overloaded with dyes always exists, resulting in disturbances to the structure of the film and in precipitations, instability and a reduction in dichroism.

Another difficulty lies in the transfer of energy which is observed fairly frequently in dye mixtures, more especially in anthraquinone and azo dye mixtures (Claussen, Brockes, Kops, Kröck, Neeff, Proc. SID, 26, 17-22 (1985)). Accordingly, light stability is a general difficulty of dichroic chromophores and, as a rule, has to be improved by the use of light stabilizers. These additives have to be compatible with the matrix which raises another problem of optimization.

The diversity of materials and properties has hitherto made it impossible to provide a polarizing film in which the dye-producing component is not iodine or an iodine complex, although this would afford distinct advantages in regard to broad-band polarizing power and in regard to resistance to moisture and heat.

It has been found that polarizing films having extremely high extinction values and an undisturbed structure can be produced by making the films separately in two or more layers.

The present invention relates to light-polarizing cast films containing polyvinyl alcohol (PVAL) and dichroic dye-producing components, optionally other dye-producing components, optionally additives and optionally auxiliaries, characterized in that they comprise two or more layers and have a sudden change in their composition at the phase boundary between at least two layers.

The present invention also relates to the multilayer cast films mentioned which are characterized in that at least two layers differ in the nature and/or concentration of their dye-producing components.

Suitable casting solutions for the production of the films according to the invention are aqueous solutions of polyvinyl alcohol and dye-producing components (hereinafter referred to as dyes) which may also contain additives. Particularly preferred solutions have solids contents of 4 to 12% by weight and a dye content based thereon of 0.1 to 7% by weight, a dye content of 0.1 to 2% by weight being preferred in the case of fluorescent dyes and a dye content of 4 to 7% by weight being preferred in the case of other colored dyes, based on a solids content of 100% by weight.

The casting solutions may optionally contain surface-active compounds, more especially anionic or amphoteric surfactants which may be used individually or in admixture to guarantee the wetting properties of the solutions. The percentage content of surface-active compounds is from 0.001 to 1% by weight and preferably from 0.005 to 0.1% by weight, based on 100% by weight casting solution.

Suitable surface-active compounds are, for example, sulfonic acids, such as alkane sulfonic acids, more particularly sulfosuccinic acid octyl ester, perfluoroalkane sulfonic acids, more particularly perfluorooctane sulfonic acid and its tetraalkyl ammonium salts, for example its tetraethyl ammonium salt, sulfates, more particularly sulfatized alkylphenol polyglycol ether, or alkyl sulfonates amphoteric surfactants, more particularly alkane amidopropyl betaines, for example lauramidopropyl betaine, or the compounds listed in Chemical Abstracts under the following REG. numbers: 73772-45-9, 96565-37-6, 4292-10-8, 59272-84-3, 25729-05-9, 6179-44-8, 21244-99-5, 58793-79-6, 32954-43-1, 92836-76-5, or nonionic surfactants, such as 4-octylphenol polyglycol ether.

Additives which have a concentration-proportional effect on dichroism and hence increase the dichroism of the dyes in the matrix may optionally be added to the casting solutions. Suitable additives in the context of the invention are, for example, lower monohydric or polyhydric alcohols, such as methanol, ethanol or glycol, glycerol, trimethylol ethane, trimethylol propane, pentaerythritol, sorbitol, ethers thereof, such as glycol monomethyl ether, glycol monomethyl ether, glycol dimethyl ether, diglycol dimethyl ether, lower hydroxyamines, such as propanolamine, or amides, such as DMF, N-methyl pyrrolidone, pyrrolidone or ε-caprolactam. The additives may be used individually or, with greater advantage, in the form of mixtures which may even include lower monohydric alcohols, for example methanol, ethanol, i-propanol, as constituents.

The concentration of the dichroism-increasing additive is dependent on the individual properties of the dichroic dyes used. Its level is limited by the technical properties of the casting solution and the film.

The additives are preferably added to the casting solution in quantities which make up 5 to 50% by weight of the casting solution.

Preferred polyvinyl alcohols according to the invention are polyvinyl alcohols which have been produced by complete or partial saponification of polyvinyl acetate, more especially types which have a viscosity of >4 mPasec and preferably 35 to 70 mPasec in the form of a 4% aqueous solution at 20° C. and a degree of saponification of >80 mol-% and preferably 85 to 100 mol-%.

The present invention also relates to a process for the production of the polarizing films according to the invention, characterized in that the casting solutions mentioned are applied to a substrate in known manner in two or more layers by means of a multiple coater and dried, the dried film is removed from the substrate and is then monoaxially stretched.

Suitable dyes are any organic dyes that are soluble in the casting solution. One advantage of the process is that the solutions of the constituents can be individually optimized. It is even possible to combine incompatible dyes in a mixture within the film, for example by casting a separating layer of uncolored material between the layers to prevent possible diffusion into the differently colored layer.

The wet thickness of the layers may be adjusted as required between 10 and 500 μm and may be varied to tone the structure of the film. Where a cascade coater is used to produce the layers, a wet layer thickness of 20 to 250 μm is preferred; where a curtain coater is used, a wet layer thickness of 25 to 600 μm is preferred.

Preferred dyes are those described in DE-A 3 921 669, DE-A 3 843 414, DE-A 3 615 765, in each case in claim 1.

The number of layers is greater than or equal to two, two to nine layers being preferred. To increase color density, the same dye may optionally be applied in several successive layers.

The layers of the foils or films according to the invention may be applied successively or simultaneously using a cascade coater or a curtain coater. These well-known methods are described in Ullmanns Encyklopäder technischen Chemie; 4. edition, volume 18, page 442.

The light-polarizing films or foils may be compounded or laminated with other non-birefringent materials by methods known per se. Suitable protective coatings are, for example, films of a tetrafluoroethylene/hexafluoroethylene copolymer or any other fluorocarbon resin, a polyester, polyolefin or polyamide resin, a polycarbonate or cellulose ester, preferably (tri)acetate, propionate or butyrate.

A layer structure in which the light stabilizers are present in the outer layer is preferred.

After drying, the layers may readily be removed from the substrate and stretched. Stretching is carried out at temperatures of 60° to 180° C. and preferably at temperatures of 100° to 150° C. by an amount of 300 to 1000%. After bonding to an optically isotropic film which is empty in the visible spectrum, polarization films are obtained which combine a very good dichroic ratio with a freely selectable color tone.

If desired, the dye-containing films may even be subjected to an aftertreatment, for example with aqueous boric acid solution, to improve their resistance to moisture or their permeability to light. The conditions under which this aftertreatment is carried out may vary irrespective of the film material and the dye. The aftertreatment is preferably carried out with a 1 to 15% by weight and, more preferably, 5 to 10% by weight boric acid solution at 30° to 80° C. and more preferably at 50° to 80° C. Surfactants and, optionally, inorganic salts are preferably added to the boric acid solution. The surfactants may be nonionic, cationic or anionic and are preferably nonionic.

Examples of nonionic surfactants are addition products of ethylene oxide with higher alcohols or phenols, for example nonylphenol. The surfactant is preferably used in a quantity of 0.005 to 0.5% by weight and more preferably in a quantity of 0.02 to 0.2% by weight, based on water. Preferred inorganic salts are sodium sulfate and also potassium sulfate, sodium chloride, potassium chloride, sodium nitrate, potassium nitrate. The inorganic salts are preferably used in a quantity of 0.1 to 5% by weight and more preferably in a quantity of 0.3 to 3% by weight. If desired, a fixing treatment may also be carried out using an aqueous solution of a high molecular weight cationic compound.

The present invention also relates to the use of the polarizing films according to the invention for the production of polarization films.

EXAMPLES

Example 1

7 g 4,4'-azo-[3-(2-sulfo-4-hydroxy-6-N-benzoylamino)naphthalene]-stilbene-2-sulfonic acid are added to, and dissolved while stirring in, a mixture of 224 g polyvinyl alcohol (Mowiol 28-99, viscosity according to DIN 53 015: 28±2 mPas, degree of hydrolysis 99.4±0.4 mol-%, ester value 8±5 mg KOH/g, a product of Hoechst AG), 4552 g water, 45 g glycerol and 372 g methanol (solution A). After stirring for 12 h at a temperature of 90° C., the solution is clarified through a Seitz filter and 50 g of a 4% by weight aqueous solution of an anionic surfactant are added. The viscosity of the casting solution is now 27.3 mPas at 40° C.

This solution is wet-coated in a thickness of 130 μm onto a plastic web moving at 75 m/second, over which warm air is passed in countercurrent. A smooth 11 μm thick film is obtained.

The film is then covered with a 150 μm thick layer of a solution of 196 g polyvinyl alcohol (Mowiol 28-99), 40 g glycerol, 3969 g water and 6 g 4,4'-azo-(4-sulfoazobenzene)-flavonic acid (solution B). A 14 μm thick film is obtained which is deep ruby-red in transmitted light and which, after stretching in a ratio of 1:6, has a contrast ratio CR of >20 in the 400 to 600 nm range. The contrast ratio is defined by A. Bloom and E. B. Priestly in IEEE, ED 24, page 1823 (1977).

The polarization films obtainable from the films according to the invention are used as polarization filters and in optical displays.

Example 2

The solutions are prepared in the same way as in Example 1, the PVAL content of solution A being increased to 10% by weight. Using a curtain coater, this solution is applied in a wet layer thickness of 200 μm between two 30 μm thick layers having the composition shown in Example 1 for solution B. A 25 μm thick film is obtained after drying and, after stretching, has a color density of 3 and a contrast ratio CR of 20 to 50 in the 400 to 600 nm range.

Example 3

A two-layer film is produced as described in Example 1. After drying of the film, a solution prepared similarly to solution A and containing Direct Blue 15 (C.I. No. 24 400) as dye is applied in a wet layer thickness of 130 μm. After drying, a 21 μm thick film is obtained which is black in reflected light and which, after stretching, has a contrast ratio of >20 over the visible spectrum between 400 and 650 nm for a color density of >2.5.

We claim:

1. A process for the production of light-polarizing cast films that comprise two or more layers and have a sudden change in their composition at the phase boundary between at least two layers, comprising applying aqueous solutions of polyvinyl alcohol and dichroic dye-producing components to a substrate in two or more layers by means of a multiple coater and drying said layers, after which the dried film is removed from the substrate and is monoaxially stretched.

2. A process as claimed in claim 1 in which the layers are applied in wet thicknesses of 10 to 500 μm.

3. A process as claimed in claim 1 in which the film removed from the substrate is stretched by 300 to 1000% at temperatures of 60° to 180° C.

* * * * *